Aug. 16, 1949.　　　S. B. HASELTINE　　　2,479,043
HAND BRAKE
Filed March 9, 1946
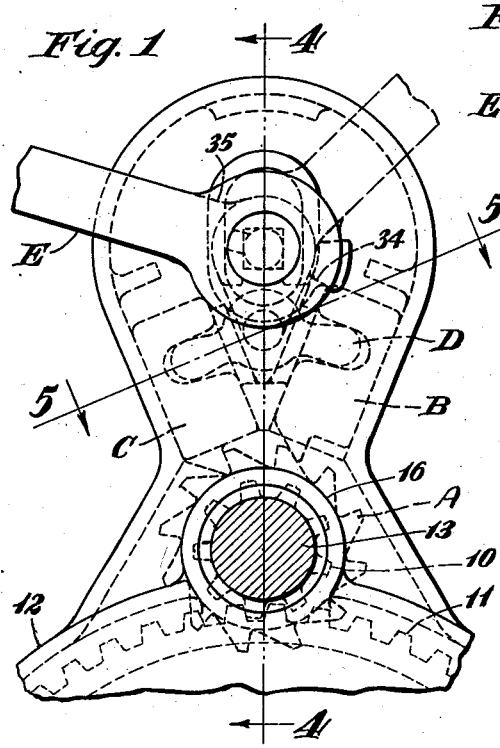
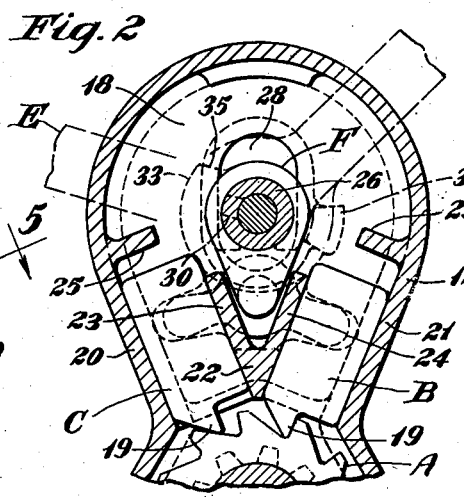
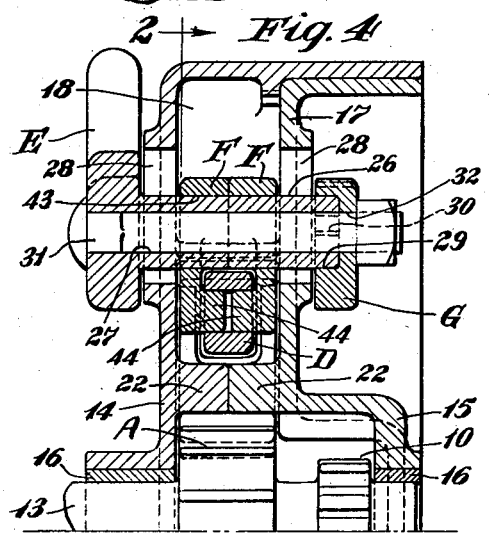
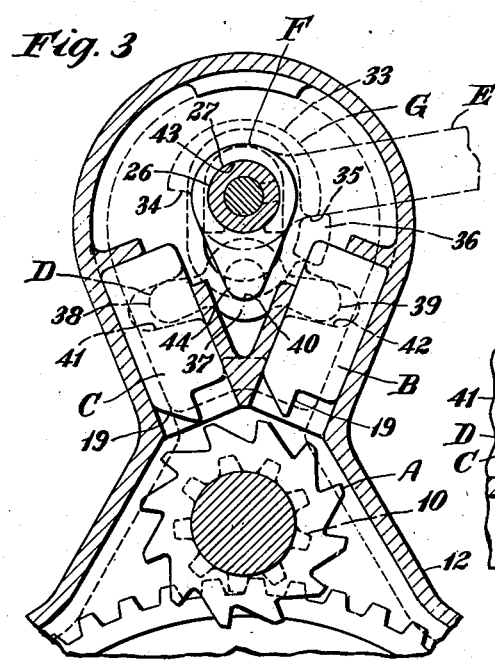
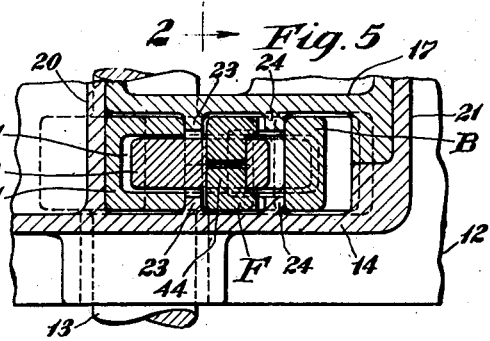
Inventor
Stacy B. Haseltine
By Henry Fuchs
Atty.

Patented Aug. 16, 1949

2,479,043

UNITED STATES PATENT OFFICE 2,479,043

HAND BRAKE

Stacy B. Haseltine, La Grange, Ill., assignor to W. H. Miner, Inc., Chicago, Ill., a corporation of Delaware Application March 9, 1946, Serial No. 653,279

4 Claims. (Cl. 188—81.1)

1

This invention relates to improvements in hand brakes.

One object of the invention is to provide a hand brake mechanism of the power multiplying type, especially adapted for railway cars, comprising a ratchet wheel and cooperating dogs for locking the mechanism against movement in releasing direction, wherein the dogs have staggered engagement with the ratchet wheel to provide for relatively fine ratcheting adjustment in applying the brakes, thus preventing excessive backing up of the racket wheel before it is locked against movement in releasing direction, thereby materially increasing the effectiveness of the brake mechanism.

A further object of the invention is to provide a hand brake mechanism of the rotary chain winding type, including the usual chain winding drum and ratchet mechanism for locking the drum against rotation in brake releasing direction, wherein the ratchet mechanism comprises a pair of sliding dogs having staggered engagement with a ratchet wheel to provide for relatively fine ratcheting adjustment, and lever actuated means for positively engaging both dogs with the ratchet wheel and simultaneously withdrawing the same from engagement with said wheel.

Other objects of the invention will more clearly appear from the description and claims hereinafter following.

In the drawing forming a part of this specification, Figure 1 is a front elevational view of the upper portion of a brake mechanism of the power multiplying, gear driven type, illustrating my improvements in connection therewith, the operating shaft being shown in transverse, vertical section. Figure 2 is a transverse, vertical sectional view, corresponding substantially to the line 2—2 of Figure 4, showing the locking dogs in ratcheting position. Figure 3 is a view, similar to Figure 2, showing the dogs completely withdrawn from engagement with the ratchet wheel. Figure 4 is a vertical sectional view, corresponding substantially to the line 4—4 of Figure 1. Figure 5 is a transverse sectional view, corresponding substantially to the line 5—5 of Figure 1.

As illustrated in the drawing, my improvements are employed in connection with a well-known type of power multiplying gear brake, employing the usual brake drum, not shown, on which the chain is wound, the drum being rotated by a driving pinion 10, actuated by the hand wheel of the brakes, not shown, and meshing with a gear 11 which is rotatable with the drum. The parts of the brake mechanism are contained in the usual housing, the upper portion only of which is shown in the drawing, and is indicated by 12.

My improved hand brake mechanism comprises broadly a ratchet wheel A rotatable with the driving pinion of the power multiplying gear brake; a set of two locking dogs B and C cooperating with the ratchet wheel; a rocker D connecting the dogs B and C; an actuating lever E; a pair of links F—F connecting the rocker to the actuating lever; and a trip element G operated by the lever.

The ratchet wheel A, which is of a well-known type, is fixed to the shaft 13, which also has the pinion 10 fixed thereto, and is actuated by the usual hand wheel, not shown, which is located on the shaft exteriorly of the housing. The shaft 13 has its opposite ends journaled in the front and rear walls 14 and 15 of the housing 12. As shown most clearly in Figure 4, the rear wall 15 of the housing is preferably in the form of a detachable closure plate, and said rear wall 15 and the front wall 14 have aligned bearing openings 16—16 which are provided with suitable bushings in which the shaft 13 is supported for rotation. Above the ratchet wheel A, the rear wall 15 of the housing is inwardly offset, as shown, the vertical wall section of said offset portion being indicated by 17. A relatively narrow chamber 18, which is in vertical alignment with the ratchet wheel, is thus provided at the top of the housing.

The locking dogs B and C are arranged above the ratchet wheel A, being supported for sliding movement in this chamber. The two dogs B and C are of similar design, except as hereinafter pointed out. Each dog is in the form of an elongated, rectangular block having a depending tooth 19 adapted to engage with the ratchet wheel. The dogs B and C are located above the ratchet wheel A at opposite sides thereof, being arranged radially with respect to the axis of rotation of said wheel and guided for vertical sliding movement between the front wall 14 and the offset wall portion 17 of the rear wall of the housing, and in direction radial to said axis by the side walls 20 and 21 of the chamber 18 of the housing and a central guide web 22 of V-shaped, vertical section. The central guide web 22 presents downwardly converging walls 23 and 24, which extend from the front wall 14 of the housing to the offset rear wall 17, said V-shaped guide web being formed partly on each of said walls, as clearly shown in Figures 4 and 5. The side walls 20 and 21 of the housing diverge upwardly, as shown in Figures 1 and 2, and are respectively parallel to the walls 23 and 24 of the central guide web 22. Limiting stop flanges 25—25, which project laterally inwardly from the walls 20 and 21 and overhang the dogs C and B, respectively, are provided to restrict upward movement of said dogs.

At the lower end thereof, the lever E has a laterally projecting stub shaft portion 26 which is of cylindrical cross section and has a central bore 27 extending through the same and the lever. The stub shaft 26 is guided for vertical sliding movement in aligned guideways 28—28 in the walls 14 and 17 of the housing, being also rotatable within these guideways while so guided. As shown in Figure 4, the shaft 26 extends entirely through the rear wall 17 of the chamber 18 of the housing and protrudes beyond said wall. The trip element G, which is mounted on the projecting end of the shaft 26, is in the form of a disc-like collar having a central opening 29 which extends partly therethrough and forms a socket within which the end of the shaft 26 fits. To lock the element G against rotation with respect to the shaft, cooperating key and slot connections 30 are provided on the same. The parts are held assembled by a retainer bolt 31, which extends through the bore 27 of the shaft 26 and the lever E and an aligned opening 32 provided in the element G, the head of the bolt being shouldered against the lever and the nut thereof bearing on the outer side of the element G. The trip element G is further provided with a laterally projecting flange 33, which extends partly therearound, thus providing a pair of circumferentially spaced shoulders 34 and 35, which cooperate with a fixed stop or abutment 36 in the form of a projecting lug on the wall 17 of the chamber 18 of the housing.

The rocker D, which connects the dogs B and C, comprises a cylindrical central portion 37 and arms 38 and 39 extending radially therefrom. The cylindrical portion 37 has a central bearing opening 40 extending transversely therethrough and adapted to receive bearing projections on the links F—F, as hereinafter pointed out. The arms 38 and 39, which project oppositely from the central portion 37 of the rocker are engaged in bearing openings 41 and 42 provided at the inner sides of the dogs C and B, respectively. The ends of the arms 38 and 39 are preferably rounded off, as shown, to prevent binding of the arms in the bearing openings of the dogs.

The links F—F are of similar design and are arranged side by side on the shaft 26 of the lever E between the walls 14 and 17 of the housing. Each link has a transverse bearing opening 43 at its upper end accommodating the shaft 26. At the lower end, each link F has a laterally inwardly projecting, relatively short trunnion 44 engaged in the corresponding end of the bearing opening 40 of the rocker. As clearly shown in Figure 4, the links F—F are confined between the walls 14 and 17 of the housing, thus being held against lateral separation and maintaining the trunnions thereof engaged in the bearing opening of the rocker. As will be evident, the rocker is thus bodily movable up and down with the shaft 26, through the link connection therewith, and is pivotally supported between its ends for rocking movement.

The several parts of the mechanism must be assembled within the housing before the cover platelike rear wall 15 is applied, and when the latter has been applied and is in fixed position it serves to hold the shaft 13 in place by engagement of the same within the bearing opening of said wall. In assembling the parts, the dogs B and C, rocker D, and links F—F are placed in position, and the shaft 26 of the operating lever engaged through the openings at the upper ends of the links F—F before the rear wall 15 of the housing is applied. After the rear wall has been placed in position, the trip element is engaged on the projecting end of the shaft 26 and the parts are secured together by the bolt 31.

The operation of my improved brake mechanism is as follows: In applying the brakes, the racket wheel is rotated in clockwise direction, as viewed in Figure 1, the dogs B and C ratcheting over the teeth of the same, being yieldingly held in engagement with the teeth of said wheel by the action of gravity on the dogs and the added weight of the lever E, which, acting through the element G, in effect, fulcrums on the abutment lug 36 by engagement of the shoulder 34 of the trip element with the underneath side of said lug, the force being transmitted to the dogs through the links F—F and the rocker D. As will be evident, alternate engagement of the dogs with the ratchet wheel is permitted by the rocking action of the rocker D which connects the dogs.

To release the brakes, the lever E is swung to the right until the shoulder 35 of the element G rests against the top of the lug 36. This position of the lever is indicated in dotted lines in Figure 1. Upon relieving the pressure on the particular dog, which is in full locking engagement with one of the teeth of the ratchet wheel, by slight tightening of the brakes, that is, rotation of the ratchet wheel in clockwise direction, the weight of the lever E in its overbalanced condition rocks on the lug 36, causing the lever and its shaft 26 to be forced upwardly, the shaft 26 riding in the guideways 28—28 and carrying the links F—F and the rocker D therewith, thereby automatically disengaging the dogs from the ratchet wheel, as illustrated in Figure 3. Inasmuch as movement of each of the dogs B and C, away from the ratch wheel, is limited by the corresponding stop flange 25, full withdrawal of both dogs to completely disengaged position is assured, the lever action of the rocker transmitting movement to either dog after movement of the other has been arrested by the corresponding stop flange.

The dogs B and C may also be forcibly disengaged from the ratchet wheel by manually swinging the lever E to the position shown in Figure 3 without slight tightening of the brakes.

To reengage the dogs with the ratchet wheel, the lever E is swung from the position shown in Figure 3 to the left, to the position shown in Figure 1, thereby engaging the shoulder 34 of the trip element with the fixed abutment 36 and depressing the shaft 26, together with the links F—F and the rocker D, thereby forcing both dogs to slide downwardly into engagement with the teeth of the ratchet wheel.

I claim:

1. In a hand brake mechanism, the combination with a member adapted to be rotated to tighten the brakes; of a ratchet wheel rotatable with said member; a pair of sliding locking dogs having staggered ratcheting engagement with said wheel; a rocker connecting said dogs; a lever operated trip element; a fixed abutment; cooperating means on said trip element and abutment for raising and lowering the trip element when the lever is swung in reverse directions; and link means connecting said rocker to said trip element for movement therewith toward and away from said ratchet wheel for throwing the dogs into and out of engagement with said wheel.

2. In a hand brake mechanism, the combination with a member adapted to be rotated to tighten the brakes; of a ratchet wheel rotatable with said member; a pair of sliding dogs having staggered engagement with said ratchet wheel; a rotary element; a rocker having oppositely projecting arms connected to said dogs respectively; link means connecting said rocker to said rotary element, said rocker being pivotally supported between its ends by said link means; a lever for rotating said element in reverse directions; a fixed abutment element; and cooperating means on said rotary element and fixed abutment element for depressing and lifting said rotary element when said lever is swung in reverse directions to throw said dogs into and out of engagement with the ratchet wheel, comprising a lug on one of said elements and a pair of spaced shoulders on the other element cooperating with said lug.

3. In a hand brake mechanism, the combination with a member adapted to be rotated to tighten the brakes; of a ratchet wheel rotatable with said member; a pair of sliding dogs having staggered engagement with said ratchet wheel; a rotary element; a swinging operating lever for rotating said element in reverse directions; a connecting link journaled at its upper end on said rotary element; a rocker pivotally connected between its ends to the lower end of said link, said rocker having arms extending oppositely from the pivotal axis thereof and engaged with said dogs respectively; a fixed abutment lug; and circumferentially spaced shoulders on said rotary element respectively engageable with said fixed abutment to depress and raise said rotary element when the lever is swung in reverse directions, thereby throwing said dogs into and out of engagement with the ratchet wheel.

4. In a hand brake mechanism, the combination with a member adapted to be rotated to tighten the brakes; of a ratchet wheel rotatable with said member; a pair of sliding locking dogs having staggered engagement with said wheel; a rotary element; means for guiding said element for movement in a path radial to the axis of rotation of said ratchet wheel; a lever fixed to said element for rotating the same in reverse directions; circumferentially spaced shoulders on said element; a fixed stop in the path of movement of said shoulders with which the same are respectively engageable for depressing and lifting said element when said lever is swung in reverse direction; a link journaled at its upper end on said element; and a rocker pivoted between its ends on the lower end of said link and having oppositely projecting arms engaged in bearing openings of said dogs respectively for transmitting movement to the latter.

STACY B. HASELTINE.

REFERENCES CITED

The following references are of record in the file of this patent:

UNITED STATES PATENTS

| Number | Name | Date |
| --- | --- | --- |
| 466,254 | Norris | Dec. 29, 1891 |
| 917,759 | Hammer | Apr. 13, 1909 |
| 1,125,325 | Hood | Jan. 19, 1915 |
| 1,510,333 | O'Connor | Sept. 30, 1924 |
| 1,512,925 | Haseltine | Oct. 28, 1924 |